US011647441B2

(12) United States Patent
Venugopal et al.

(10) Patent No.: US 11,647,441 B2
(45) Date of Patent: May 9, 2023

(54) METHODS AND APPARATUS FOR UPGRADING COMMUNICATION QUALITY

(71) Applicant: QUALCOMM Incorporated, San Diego, CA (US)

(72) Inventors: Pavan Venugopal, San Diego, CA (US); Abhijeet Prasad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/506,861

(22) Filed: Jul. 9, 2019

(65) Prior Publication Data
US 2021/0014763 A1    Jan. 14, 2021

(51) Int. Cl.
H04W 36/30      (2009.01)
H04W 36/00      (2009.01)
H04N 7/24       (2011.01)
H04L 65/10      (2022.01)
H04L 65/1104    (2022.01)

(52) U.S. Cl.
CPC ......... *H04W 36/30* (2013.01); *H04L 65/1104* (2022.05); *H04N 7/24* (2013.01); *H04W 36/0022* (2013.01); *H04N 2007/246* (2013.01)

(58) Field of Classification Search
CPC ......... H04W 28/0252; H04W 28/0268; H04W 52/0203
See application file for complete search history.

(56) References Cited

U.S. PATENT DOCUMENTS

2016/0302128 A1* 10/2016 Anchan ............ H04W 36/0022
2018/0139661 A1*  5/2018 Kumar ................... H04W 8/06
2019/0215729 A1*  7/2019 Oyman ................. H04L 65/80
2019/0320480 A1* 10/2019 Patil ..................... H04W 24/10
2019/0320483 A1* 10/2019 Palat .................... H04W 76/19

* cited by examiner

Primary Examiner — Ayaz R Sheikh
Assistant Examiner — Debebe A Asefa
(74) Attorney, Agent, or Firm — Procopio, Cory, Hargreaves & Savitch/Qualcomm Incorporated

(57) ABSTRACT

The present disclosure relates to transmitting and receiving communications including an upgraded communication quality at a first UE and a second UE. The first UE can determine the first UE is operating using a first RAT. The first UE can also initiate a communication comprising video media between the first UE and a second UE, where a communication quality of the communication is based on the first RAT, where the second UE is operating using a second RAT supporting a higher communication quality than the first RAT. Additionally, the first UE can determine that the first UE is in coverage of the second RAT. The first UE can also indicate, to the second UE, that the first UE is in the coverage of the second RAT. Further, the first UE can adjust the communication quality of the communication to the higher communication quality for the second RAT.

25 Claims, 13 Drawing Sheets

METHODS AND APPARATUS FOR UPGRADING COMMUNICATION QUALITY

BACKGROUND

Technical Field

The present disclosure relates generally to communication systems, and more particularly, to methods and devices for transmitting and/or receiving communications including an upgraded communication quality.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus can determine the first UE is operating using a first radio access technology (RAT). The apparatus can also initiate a communication comprising video media between the first UE and a second UE, where a communication quality of the communication is based on the first RAT, where the second UE is operating using a second RAT supporting a higher communication quality than the first RAT. Also, the apparatus can determine that the first UE is in coverage of the second RAT. The apparatus can also indicate, to the second UE, that the first UE is in the coverage of the second RAT. The apparatus can also adjust the communication quality of the communication to the higher communication quality for the second RAT. Additionally, the apparatus can determine whether the first UE is operating using the second RAT. The apparatus can also receive a first indication from the second UE, where the first indication indicates the second UE is operating using the second RAT. Further, the apparatus can hand off from the first RAT to the second RAT. The apparatus can also transmit a second indication to the second UE, where the second indication indicates the first UE is operating using the second RAT. The apparatus can also encode the second indication prior to transmitting the second indication to the second UE. Moreover, the apparatus can receive a session initiation protocol (SIP) update from the second UE, wherein the SIP update indicates a video rate based on the second RAT. The apparatus can also accept the SIP update from the second UE, wherein the communication following acceptance of the SIP update is transmitted using the video rate indicated in the SIP from the second UE.

In another aspect of the disclosure, a method, a computer-readable medium, and an apparatus are provided. The apparatus can determine the first UE is operating using a first RAT supporting a higher communication quality than a second RAT. The apparatus can also initiate a communication comprising video media between the first UE and a second UE operating using the second RAT including a communication quality based on the second RAT. The apparatus can also receive a first indication from the second UE, where the first indication indicates the first UE is in coverage of the first RAT. Also, the apparatus can adjust the communication quality of the communication to the higher communication quality of the first RAT when the second UE is operating using the first RAT. Further, the apparatus can transmit a second indication to the second UE, where the second indication indicates the first UE is operating using the first RAT. The apparatus can also transmit a SIP update to the second UE indicating the first UE supports the communication quality based on the first RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
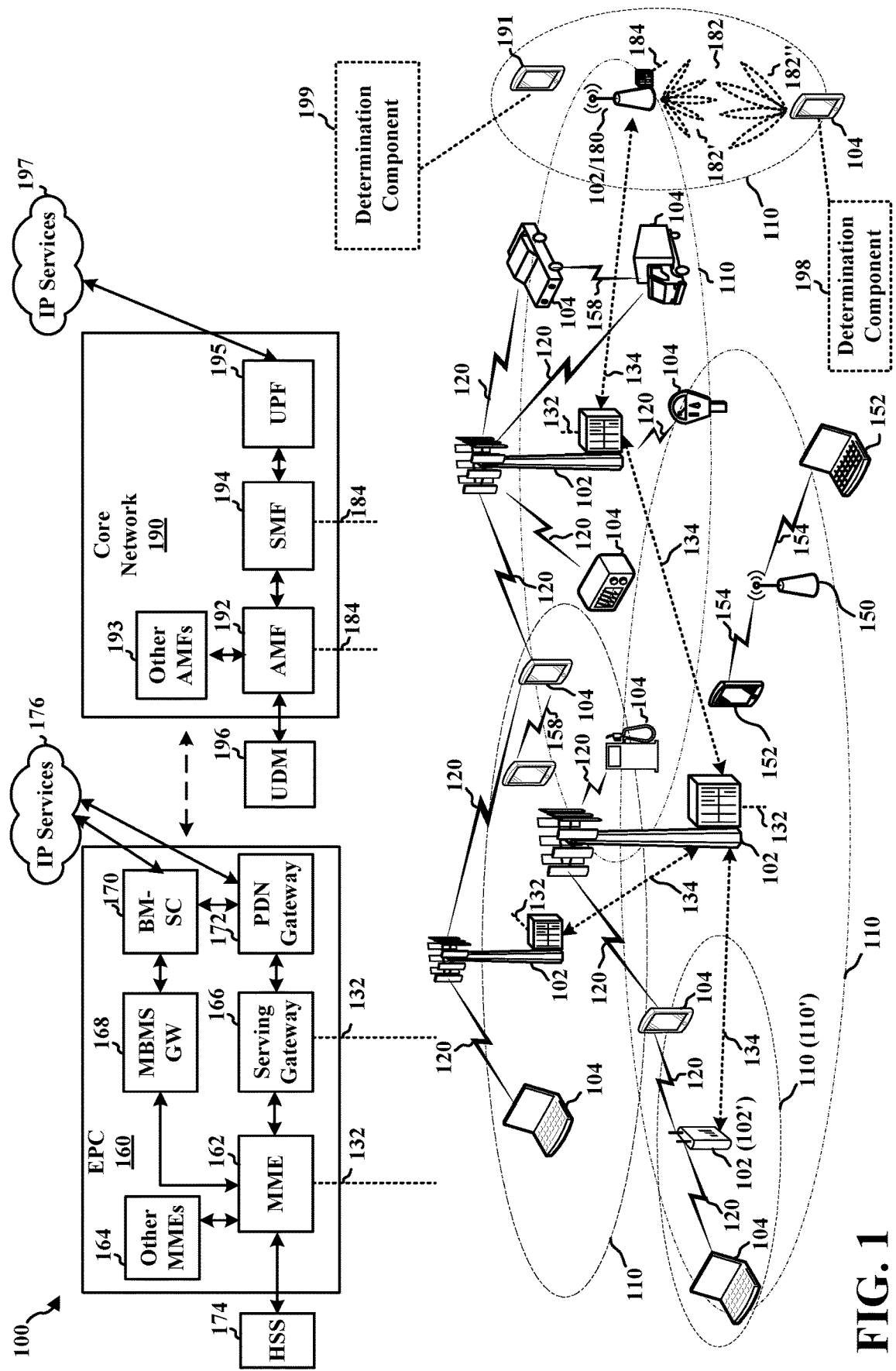
FIG. 1 is a diagram illustrating an example of a wireless communications system and an access network.

It will be appreciated that some prior systems may fail to upgrade/downgrade video telephony (VT) call quality based on new radio (NR) coverage availability. Such systems may limit video resolution to 720p for VT calls in view of a currently available wireless bandwidth or may allow a downgrade of call quality in case of decreased bandwidth, but may not allow an upgrade of call quality in case of increased bandwidth. It will be appreciated that upgrading VT calls based on NR coverage availability can allow a UE and/or user to change the call quality and utilize higher resolution videos, e.g., 4K or 8K videos, which correspond to a higher bit rate. In one example embodiment, a higher quality of video may be provided per a user request when NR coverage is available. Also, the UE may automatically reduce the bit rate when the UE moves from NR to 4G coverage, as well as increase the bit rate when moving to NR coverage.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to determine the first UE is operating using a first radio access technology (RAT). The determination component 198 may also be configured to initiate a communication comprising video media between the first UE and a second UE, where a communication quality of the communication is based on the first RAT, where the second UE is operating using a second RAT supporting a higher communication quality than the first RAT. Also, the determination component 198 may be configured to determine that the first UE is in coverage of the second RAT. The determination component 198 may also be configured to indicate, to the second UE, that the first UE is in the coverage of the second RAT. The determination component 198 may also be configured to adjust the communication quality of the communication to the higher communication quality for the second RAT. The determination component 198 may also be configured to determine whether the first UE is operating using the second RAT. The determination component 198 may also be configured to receive a first indication from the second UE, where the first indication indicates the second UE is operating using the second RAT. The determination component 198 may also be configured to hand off from the first RAT to the second RAT. The determination component 198 may also be configured to transmit a second indication to the second UE, where the second indication indicates the first UE is operating using the second RAT. The determination component 198 may also be configured to encode the second indication prior to transmitting the second indication to the second UE. Moreover, the determination component 198 may be configured to receive a session initiation protocol (SIP) update from the second UE, wherein the SIP update indicates a video rate based on the second RAT. The determination component 198 may also be configured to accept the SIP update from the second UE, where the communication following acceptance of the SIP update is transmitted using the video rate indicated in the SIP from the second UE.

Additionally, the UE 191 may include a determination component 199 configured to determine the first UE is operating using a first RAT supporting a higher communication quality than a second RAT. The determination component 199 may also be configured to initiate a communication comprising video media between the first UE and a second UE operating using the second RAT including a communication quality based on the second RAT. The determination component 199 may also be configured to receive a first indication from the second UE, where the first indication indicates the first UE is in coverage of the first RAT. The determination component 199 may also be configured to adjust the communication quality of the communication to the higher communication quality of the first RAT when the second UE is operating using the first RAT. The determination component 199 may also be configured to transmit a second indication to the second UE, where the second indication indicates the first UE is operating using the first RAT. The determination component 199 may also be configured to transmit a SIP update to the second UE indicating the first UE supports the communication quality based on the first RAT.

Figure 2:
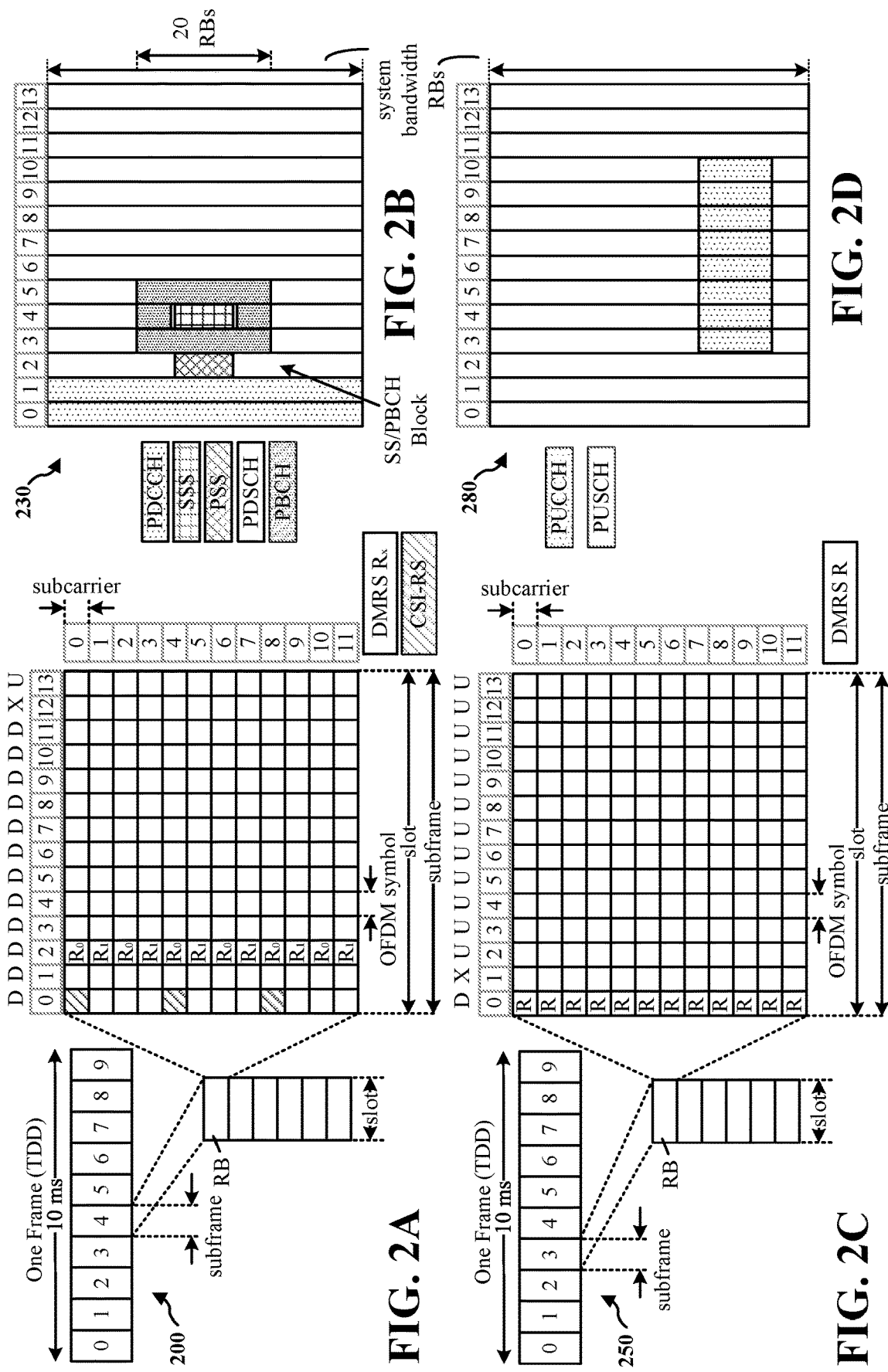
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
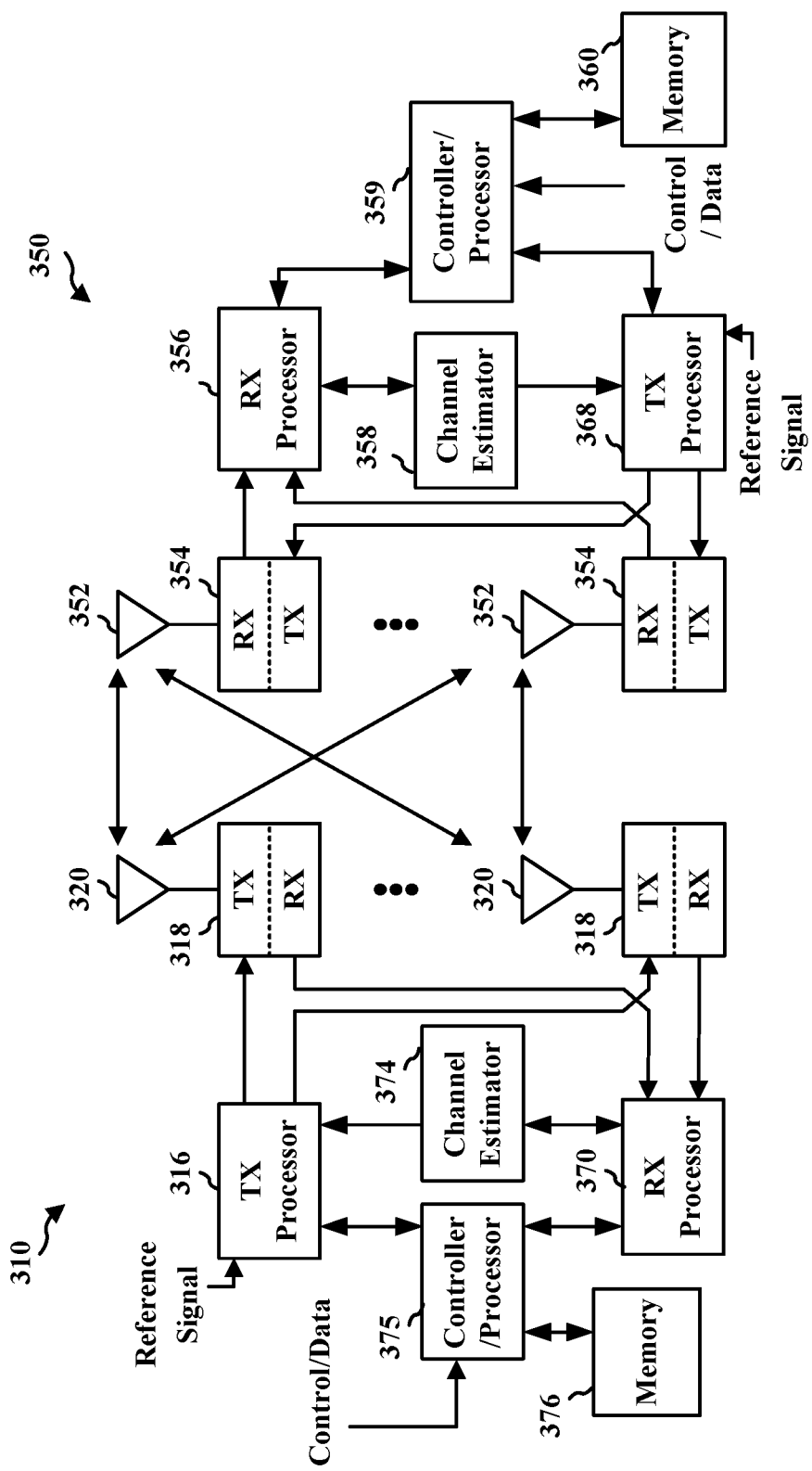
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE

350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 368, the RX processor 356, and the controller/processor 359 may be configured to perform aspects in connection with 199 of FIG. 1.

Some aspects of wireless communication may not upgrade or downgrade a communication quality during the communication or call. For instance, some wireless communications may not upgrade or downgrade a video telephony (VT) call quality based on the availability of a radio access technology (RAT) that offers a higher resolution, e.g., fourth generation (4G) long term evolution (LTE) or fifth generation (5G) new radio (NR). Accordingly, some aspects of wireless communication may not adjust the communication quality of VT based on the RAT availability.

Upgrading or downgrading the communication quality based on RAT availability may allow a UE and a user to change the communication quality, such as to explore higher resolutions for video calls when coverage becomes available for a RAT that enables higher bit rates, higher resolution, etc. For example, when a UE enters coverage of a RAT that supports a higher resolution, e.g., 5G NR, upgrading the communication quality may allow a user to experience higher resolution videos, e.g., 4K or 8K videos. These higher resolution videos may need a higher bit rate than supported by other RATs, e.g., 4G LTE, such that a user may not be able to experience these resolutions when operating using the other RAT that supports lower resolutions. As such, by upgrading the communication quality based on RAT availability may allow a UE or user to experience a higher quality of communication, such as in video or VT calls.

Aspects of the present disclosure can aim to provide the improved quality of communication or video based on the RAT availability. For instance, aspects of the present disclosure can upgrade the communication or video quality, e.g., as per user request, when a higher RAT is available, e.g., NR compared to LTE. Accordingly, aspects of the present disclosure can upgrade a video call quality based on the RAT availability, e.g., when moving from LTE to NR. In some instances, UEs according to the present disclosure may also adjust or reduce the quality or bit rate of communication once the UE moves from a RAT supporting higher resolution to a RAT supporting lower resolution, e.g., from NR to LTE.

In some aspects, the maximum available bandwidth can be adjusted when moving from a lower supported RAT to a higher supported RAT, or when moving from a higher supported RAT to a lower supported RAT. For instance, aspects of the present disclosure can utilize a higher resolution of video or audio communication based on the maximum available bandwidth. In some aspects, the present disclosure can maximize or optimize the ability to utilize a higher resolution when a higher resolution RAT is available, e.g., 5G NR. For example, the audio or video quality may be automatically upgraded based on the RAT availability, such as increasing the available resolution of a video or VT call. As mentioned herein, the video quality or resolution can also be adjusted based on the RAT coverage of the user or UE.

In some aspects, the present disclosure may determine the RAT coverage of multiple users, e.g., users that are streaming video with each other. The present disclosure can then set the video quality based on the lowest RAT coverage of the multiple users. In these instances, the lowest RAT coverage may determine the communication quality. In other aspects, the present disclosure can determine the communication quality based on the RAT coverage of a single user. The present disclosure can also upgrade the bit rate of the communication if one user moves to a higher RAT coverage area, e.g., from 4G LTE to 5G NR. In some instances, this may occur if the other user is already in a higher RAT coverage area. The present disclosure can also downgrade the bit rate of the communication if one user moves to a lower RAT coverage area, e.g., from 5G NR to 4G LTE.

In some instances, aspects of the present disclosure may determine a first RAT coverage for a first user or UE and a second RAT coverage for a second user or UE. Aspects of the present disclosure can then initiate a communication between the first user and the second user based on the first RAT coverage and the second RAT coverage. Further, aspects of the present disclosure can determine whether the first RAT coverage changes or the second RAT coverage changes. Aspects of the present disclosure can then adjust the communication quality for the communication when the first RAT coverage or the second coverage RAT changes. For example, if the first RAT coverage is at a higher RAT, e.g., 5G NR, and the second RAT coverage is at a lower RAT, e.g., 4G LTE, the present disclosure can adjust the communication quality when the second RAT coverage moves to the higher RAT. By doing so, aspects of the present disclosure can account for both users being at the higher RAT coverage.

As mentioned above, the present disclosure can detect the type of RAT coverage utilized by a user or UE. For example, aspects of the present disclosure can detect whether a user is in coverage for Wi-Fi, 4G LTE, or 5G NR. As aspects of the present disclosure can detect when one user switches RAT coverage levels, other users may propose that the quality of VT should be adjusted based on the availability of a RAT that supports a higher resolution. For example, one user or UE may propose that the communication quality should be increased when both users are on a higher RAT coverage level, e.g., 5G NR compared to 4G LTE.

Figure 4:
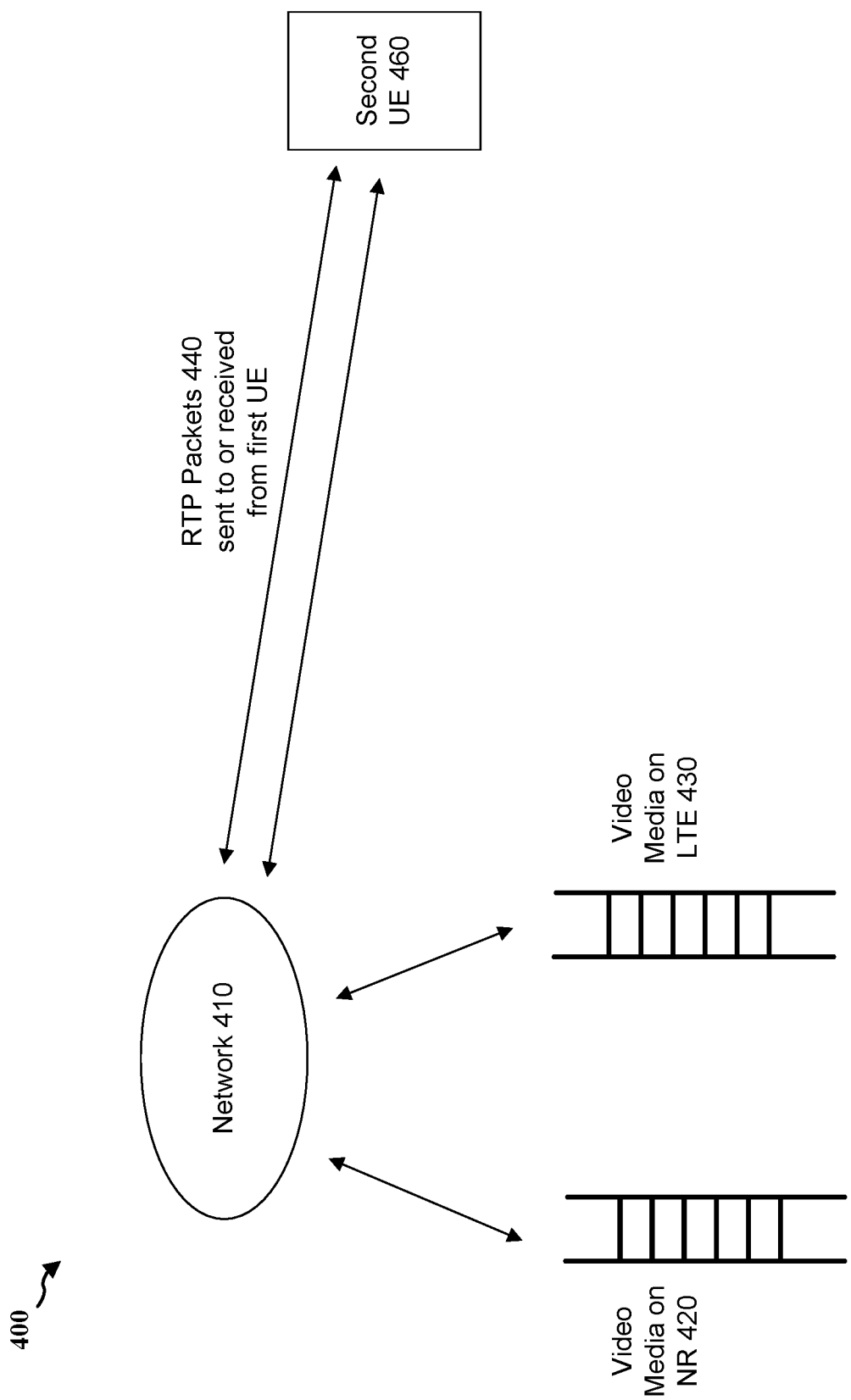
FIG. 4 is a diagram illustrating example transmissions between multiple UEs.

FIG. 4 is a diagram 400 illustrating example transmissions between multiple UEs. Diagram 400 includes network 410, video media 420, video media 430, real-time transport protocol (RTP) packets 440, a first UE, and second UE 460. As shown in FIG. 4, first UE can send RTP packets 440 to, or receive RTP packets 440 from, second UE 460. In some aspects, the data packets can be transmitted via network 410. In other aspects, the first UE and the second UE 460 can transmit or receive data packets directly to/from each other. Additionally, first UE can communicate with second UE 460 using video media 420, e.g., on 5G NR, or video media 430, e.g., on 4G LTE.

In some aspects, first UE can second UE 460 can be operating using different RATs. For instance, first UE can be operating using 4G LTE and second UE 460 can be operating using 5G NR. In these instances, as first UE is operating using LTE, the present disclosure may set the video quality of communication to account for LTE quality. Additionally, first UE can send or receive data packets or RTP packets 440 to second UE 460. In some aspects, first UE can include an real-time transport control protocol (RTCP) application specific (APP) packet that may let the second UE 460 know which coverage the first UE is experiencing, e.g., Wi-Fi, LTE, NR, etc.

In some instances, once first UE transfers to a higher RAT coverage area, e.g., to 5G NR, the video communication or data packets can also utilize quality or resolution that is supported by the higher RAT coverage area. Based on the data packets, e.g., the RTCP APP packets, aspects of the present disclosure can start to use NR communication parameters, e.g., quality of signal, etc.

Additionally, aspects of the present disclosure can help the two UEs upgrade the quality of the call, e.g., the videos can increase the resolution to 8K or 4K. Accordingly, aspects of the present disclosure can make sure that the users are utilizing improved video quality. In some aspects, when one of the users downgrades RAT coverage, e.g., from NR to LTE, then the present disclosure can reduce the resolution to the maximum supported resolution for that particular coverage, e.g., LTE supported resolution when downgrading from NR. Likewise, whenever a user upgrades RAT coverage, e.g., from LTE to NR, then the present disclosure can increase the resolution to the maximum supported resolution for that particular coverage, e.g., NR supported resolution when upgrading from LTE.

As mentioned herein, aspects of the present disclosure can determine a RAT coverage for multiple UEs, e.g., Wi-Fi, LTE, or NR. After determining a RAT coverage level for the multiple UEs, the present disclosure can adjust the quality level of the communication based on the highest available quality for the corresponding RAT coverage level. As such, aspects of the present disclosure can adjust the coverage level from LTE to NR, or vice versa.

Also, if a first UE is operating using NR and a second UE is operating using LTE, the communication quality may not be upgraded to a resolution or bit rate supported by NR, as one user is still limited to a lower resolution/bit rate based on LTE. For instance, the user on NR may determine that the other user is operating using LTE, so the quality level of the VT may not be upgraded to the higher resolution. Accordingly, the present disclosure can adjust to the lowest quality level based on the respective coverage level for the UEs. For example, if one user is operating using LTE, then the video quality for the communication may correspond to an LTE supported quality. Thus, in some aspects, the video quality of the VT call may be based on the lowest RAT coverage between multiple UEs, e.g., whether that RAT coverage is LTE or NR. The present disclosure can also upgrade and/or downgrade the communication or video call quality once in a higher or lower RAT coverage based on a message or data packet, e.g., the header in a RTCP packet.

In some instances, when the video call is being communicated, an RTCP frame may inform the first UE of the RAT coverage of the second UE, as well as inform the second UE of the RAT coverage of the first UE. Also, an RTCP frame can inform either UE of the quality of the video communication. An RTCP frame can also inform either UE of the channel conditions. By doing so, each UE can determine the coverage of the other UE. Also, when one UE upgrades or downgrades its RAT coverage, it may inform the other UE through an RTCP APP packet.

Figure 5:
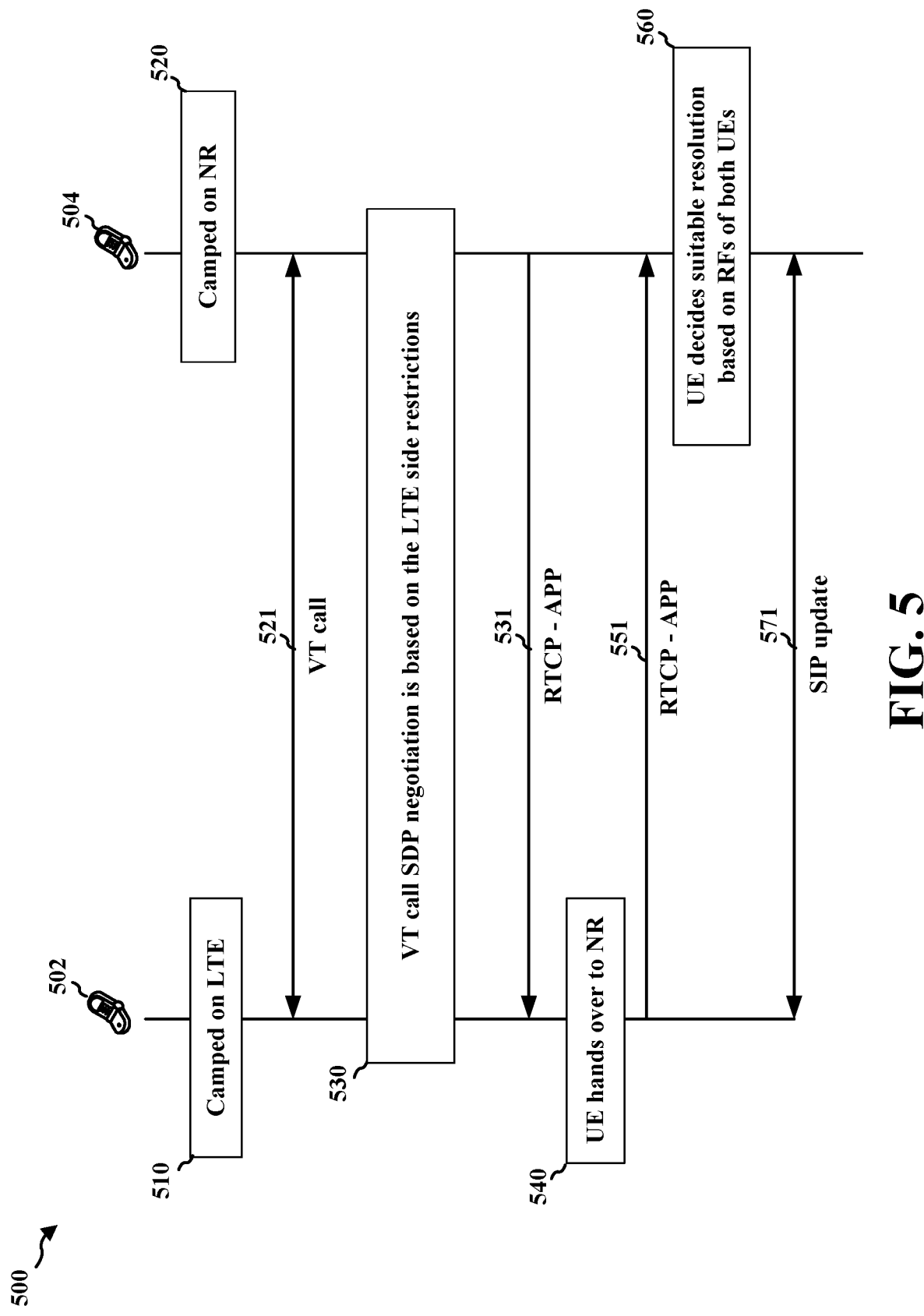
FIG. 5 is a diagram illustrating transmissions between multiple UEs.

FIG. 5 is a diagram 500 illustrating transmissions between UE 502 and UE 504. As shown in FIG. 5, at 510, UE 502 is camped on LTE. At 520, UE 504 is camped on NR. At 521, the VT call is initiated. As shown in FIG. 5, the VT call may be ongoing between UE 502 and UE 504. As shown in FIG. 5, when the VT call was initiated, UE 504 was on NR and UE 502 was on LTE. In some aspects, UE 502 and UE 504 may agree on a lowest video quality. For example, UE 504 can support higher data rates and bandwidth, but the UE 502 cannot, so they settle on LTE quality.

During the lifetime of the call, the UEs 502/504 may continue to exchange videos, video packets, keep-alive signaling, and/or control messages, e.g., to monitor the health of the VT call. The UEs can do so through the RTCP APP messages 531 and 551. For example, UE 504 may inform UE 502 on its perceived health of the call, and UE 502 does the same by informing UE 504. In some aspects, by doing so the UEs can embed information stating whether they are in LTE or 5G coverage.

At 530, the VT call session description protocol (SDP) negotiation may be based on the LTE restrictions at UE 502. For instance, the VT call may be setup as a lower bit rate quality call, e.g., video graphics array (VGA) call with 900 kbps. Additionally, at 531, the RTCP APP can inform UE 502 that UE 504 is on NR coverage and wants to try a higher resolution call.

At 540, the UE 502 hands over to NR. When the UE 502 hands over, it can inform UE 504, e.g., via an RTCP APP. As UE 502 is in 5G NR coverage, and as UE 504 is already in 5G NR coverage, so the lowest common quality is now supported by 5G NR. As such, the UEs can adjust the video quality to 5G NR supported quality At 551, UE 502 can inform UE 504, e.g., with an RTCP APP packet, that it is operating using NR (e.g., has performed a handover to NR) and RF metrics. For example, when the UE 502 hands over to NR, the lower layer of the device, e.g., medium layer that carries the data packet, may determine that the device has moved to NR. In some aspects, the present disclosure can transfer this information to the internet protocol (IP) multimedia subsystem (IMS) layer, e.g., the upper layer. Once the IMS layer determines this information, the subsequent RTCP packet that is transmitted may reflect this upgrade. After this, the UE 504 can also determine that the UE 502 has upgraded. Also, the IMS layer may negotiate the bandwidth of the video call during the initial call setup. Accordingly, aspects of the present disclosure may allow a call to be upgraded without going through much signaling. Once the call is setup, the present disclosure can adjust the quality of the call based on the IMS layer, e.g., using the information in the RTCP APP packet. Additionally, both UEs may remain on the NR coverage and not adjust their RAT coverage level.

At 560, the UE 504 decides on a suitable call resolution based on its own radio frequency (RF) and/or the RF of UE 502. At 571, UE 504 can trigger an SIP update procedure to increase the resolution level of the call, e.g., to a resolution level supported by NR coverage. For example, once the resolution level is supported by NR coverage, the UE 502 and UE 504 can communicate using videos with a higher resolution than is supported by LTE coverage, e.g., 4K or 8K resolution for NR coverage compared to 720p resolution for LTE coverage. Additionally, once the resolution level is supported by NR coverage, aspects of the present disclosure can utilize different levels, e.g., level 4.0 or 5.0.

In some aspects, if a UE hands over to a new RAT, then the change of RAT may be indicated to the other UE. The present disclosure can use this information to adjust the call quality, e.g., based on the information exchange in the handshake agreement. In some instances, once both UEs understand that there has been a coverage change, then the current call may not need to be disconnected. As indicated herein, aspects of the present disclosure can perform an SIP update or SIP re-invite procedure to adjust the call quality.

As mentioned above, aspects of the present disclosure can utilize different communication flow steps when moving from one RAT coverage to another. For example, one UE can use video RTP packets to inform another UE it is moving from LTE coverage to NR coverage. In some aspects, a first UE can start a VT call with a second UE when the video media is transmitted using a lower bit rate/quality that is supported by LTE, but the maximum available bandwidth may be based on 5G NR. The second UE can receive and transmit the media over 5G. Additionally, when the first UE transitions to NR coverage and has high bandwidth, the first UE can include an NR coverage tag in the data packets, e.g., RTCP APP packets. The second UE can be aware that the first UE is already in 5G coverage by receiving and/or decoding the data packet or RTCP APP packet. Also, the second UE can send an SIP update with the highest possible video rate and resolution supported by NR coverage. Once the first UE accepts the SIP update, both UEs can transmit at the new high video rate and communication quality. As such, once the negotiation between the first UE and the second UE is finished, the video quality can be upgraded to a higher level, e.g., move from LTE quality to NR quality.

In some aspects, one or more video packets can be communicated between a first UE and a second UE, where the video packets can be video RTP packets. Additionally, in some aspects, one or more messages can be communicated between the first UE and the second UE, where the one or more messages are RTCP messages or RTCP APP packets. As mentioned above, the one or more messages can include an SIP update. Moreover, the communication between multiple UEs can be an SDP communication.

Figure 6:
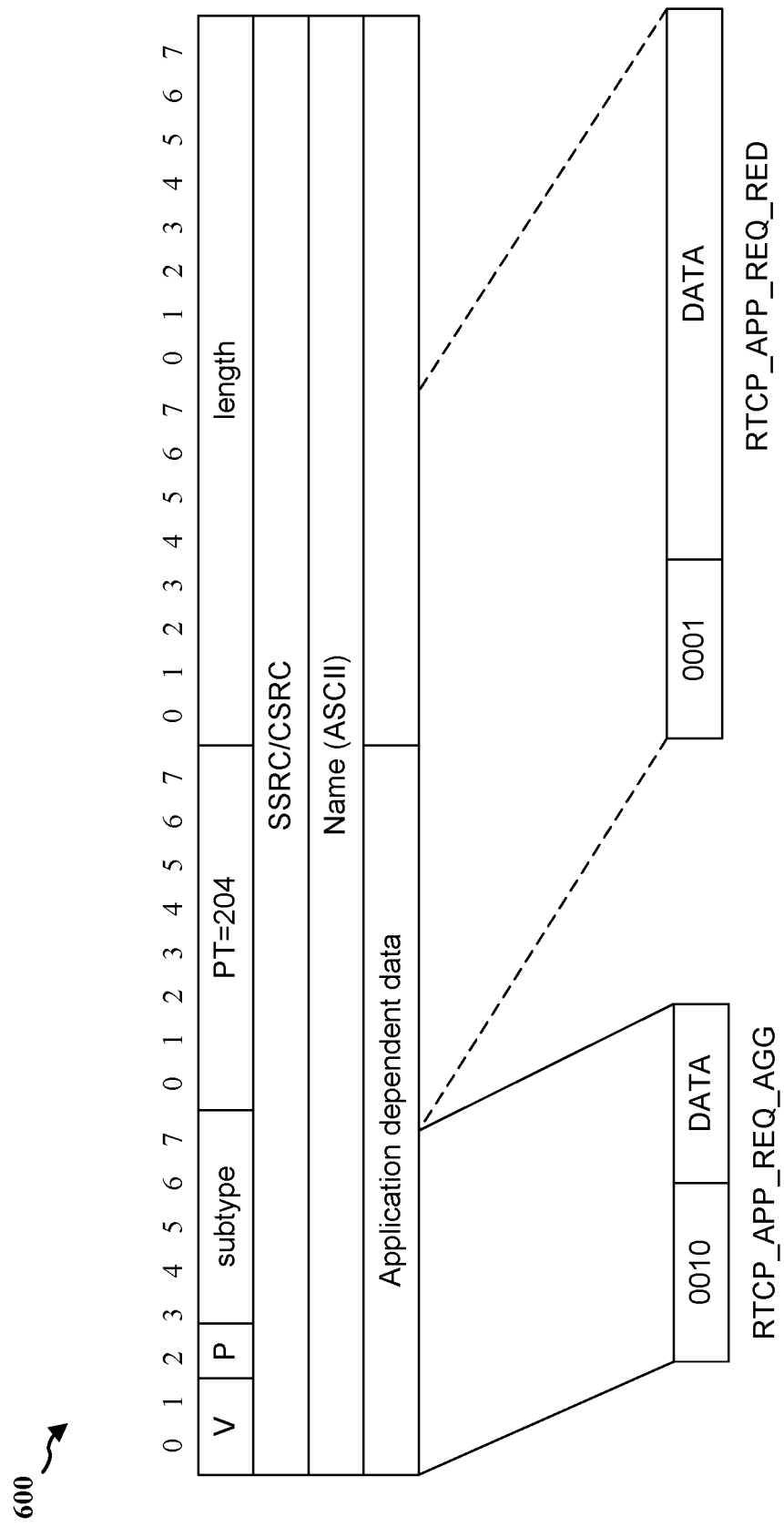
FIG. 6 is an example data packet transmitted between multiple UEs.

FIG. 6 is an example data packet 600 transmitted between multiple UEs. For instance, FIG. 6 displays a general format of an RTCP APP packet, e.g., with certain codec control requests. The RTCP APP packet 600 can be used for adaptation signaling, e.g., for speech in multimedia telephony service for IMS (MTSI). Additionally, the RTCP APP packet 600 can be used to embed the message of whether a UE is on a certain RAT coverage, e.g., Wi-Fi, LTE, or NR. As such, the RTCP APP packet 600 can be used to embed certain information transmitted from one UE to another UE. The RTCP APP packet can also inform one UE whether the video quality can be adjusted.

Aspects of the present disclosure can include different proposed fields in RTCP APP packets. For example, RTCP APP packets can include a field for the RAT type, e.g., NR, LTE, 3G, Wi-Fi, etc. RTCP APP packets can also include a field for different RF metrics, e.g., reference signal received power (RSRP), reference signal received quality (RSRQ), signal-to-interference-plus-noise ratio (SINR), UE uplink transmission power, RI, and/or uplink or downlink block error rate (BLER).

Additionally, aspects of the present disclosure can include code for an RTCP APP packet. For example, aspects of the present disclosure can use the following code for an RTCP APP packet:

```
/*---------------------------------------------------------------
       0                   1                   2                   3
       0 1 2 3 4 5 6 7 8 9 0 1 2 3 4 5 6 7 8 9 0 1 2 3 4 5 6 7 8 9 0 1
      +-+-+-+-+-+-+-+-+-+-+-+-+-+-+-+-+-+-+-+-+-+-+-+-+-+-+-+-+-+-+-+-+
```

-continued

```
|V=2|P| subtype |  PT=APP=204  |       length        |
+-+-+-+-+-+-+-+-+-+-+-+-+-+-+-+-+-+-+-+-+-+-+-+-+-+-+-+-+-+-+-+-+
|                    SSRC/CSRC                       |
+-+-+-+-+-+-+-+-+-+-+-+-+-+-+-+-+-+-+-+-+-+-+-+-+-+-+-+-+-+-+-+-+
|                    name (ASCII)                    |
+-+-+-+-+-+-+-+-+-+-+-+-+-+-+-+-+-+-+-+-+-+-+-+-+-+-+-+-+-+-+-+-+
|            application-dependent data         ...
+-+-+-+-+-+-+-+-+-+-+-+-+-+-+-+-+-+-+-+-+-+-+-+-+-+-+-+-+-+-+-+-+
----------------------------------------------------------------*/
typedef struct {
boolean valid;            /* flag to denote this is valid */
uint32 ssrc;              /* src id from the sender */
uint32 s_ssrc;            /* src id of the source */
uint8 name[QVP_RTCP_APP_NAME_LENGTH + 1]; /* name of the app pkt */
uint8 app_data[QVP_RTCP_MAX_APP_DATA_LEN];
uint16 data_len; /*length of the data */
uint8 sub_type; /*sub type of the app packet*/
uint8 msg_type;
uint32 network_type;
uint8 e_type;
uint8 e_value;
uint8 e_length;
} qvp_rtcp_app_type;
```

Aspects of the present disclosure can provide a number of different benefits or advantages. For instance, the present disclosure can help a user or UE obtain the best rate possible for communication with another device when both devices are in NR coverage, thereby making the best use of NR bandwidth. As such, the present disclosure can use the maximum communication quality for the lowest RAT coverage for a UE. Accordingly, the present disclosure can provide a user or UE the maximum communication quality, e.g., by utilizing a 5G enabled device. In addition, aspects of the present disclosure can provide a highest quality video call with a fast change in the video rate, e.g., without much signaling.

Figure 7:
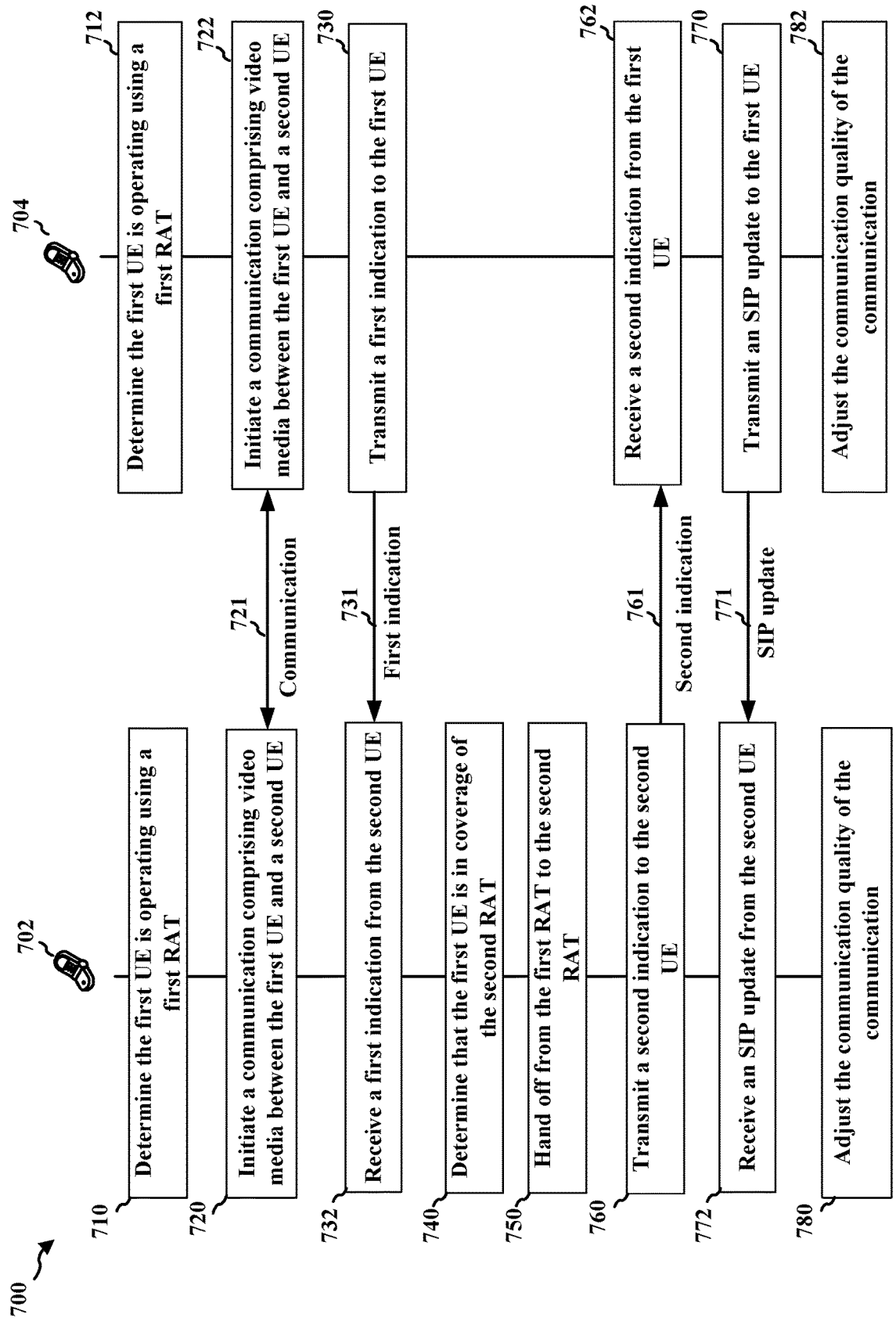
FIG. 7 is a diagram illustrating transmissions between multiple UEs.

FIG. 7 is a diagram 700 illustrating transmissions between a first UE 702 and a second UE 704. For instance, first UE 702 may determine 710 the first UE is operating using a first RAT. Second UE 704 can also determine 712 the first UE 702 is operating using a first RAT. First UE 702 can also initiate 720 a communication 721 comprising video media between the first UE and a second UE, where the communication quality of the communication 721 can be based on the first RAT, and where the second UE 704 can be operating using a second RAT supporting a higher communication quality than the first RAT. Second UE 704 can also initiate 722 a communication 721 comprising video media between the first UE and a second UE.

Second UE 704 can also transmit 730 a first indication 731 to the first UE 702, where the first indication 731 indicates the second UE is operating using the second RAT. In some aspects, the first indication 731 can be transmitted and/or received in one or more first data packets. Likewise, first UE 702 can receive 732 first indication 731 from the second UE. First UE 702 can also determine 740 that the first UE is in coverage of the second RAT. Additionally, first UE 702 can determine whether the first UE is operating using the second RAT. First UE 702 can also hand off 750 from the first RAT to the second RAT.

The first UE 702 can also encode a second indication 761 prior to transmitting the second indication to the second UE 704. First UE 702 can also indicate, to the second UE, that the first UE is in the coverage of the second RAT. Further, first UE 702 can transmit 760 a second indication 761 to the second UE 704, where the second indication 761 indicates the first UE is operating using the second RAT. Likewise, second UE 704 can receive 762 the second indication 761 from the first UE 702. In some aspects, the second indication 761 can be transmitted to the second UE in one or more second data packets.

Second UE 704 can also transmit 770 an SIP update 771 to the first UE 702, where the SIP update 771 indicates a video rate based on the first RAT. Likewise, first UE 702 can receive 772 the SIP update 771 from the second UE 704. First UE 702 can also accept the SIP update 771 from the second UE 704, where the communication following acceptance of the SIP update can be transmitted using the video rate indicated in the SIP from the second UE. The first UE 702 can also adjust 780 the communication quality of the communication to the higher communication quality for the second RAT. Likewise, the second UE 704 can adjust 782 the communication quality of the communication to the higher communication quality for the second RAT.

In some aspects, a lower resolution may be supported by the first RAT and a higher resolution may be supported by the second RAT. Also, the communication can comprise a video telephony (VT) call, where the communication quality includes a resolution of the VT call. Further, a bandwidth supported by the first RAT may be different from a bandwidth supported by the second RAT. In some aspects, the first RAT can comprise Wi-Fi or long term evolution (LTE) and the second RAT can comprise new radio (NR).

Figure 8:
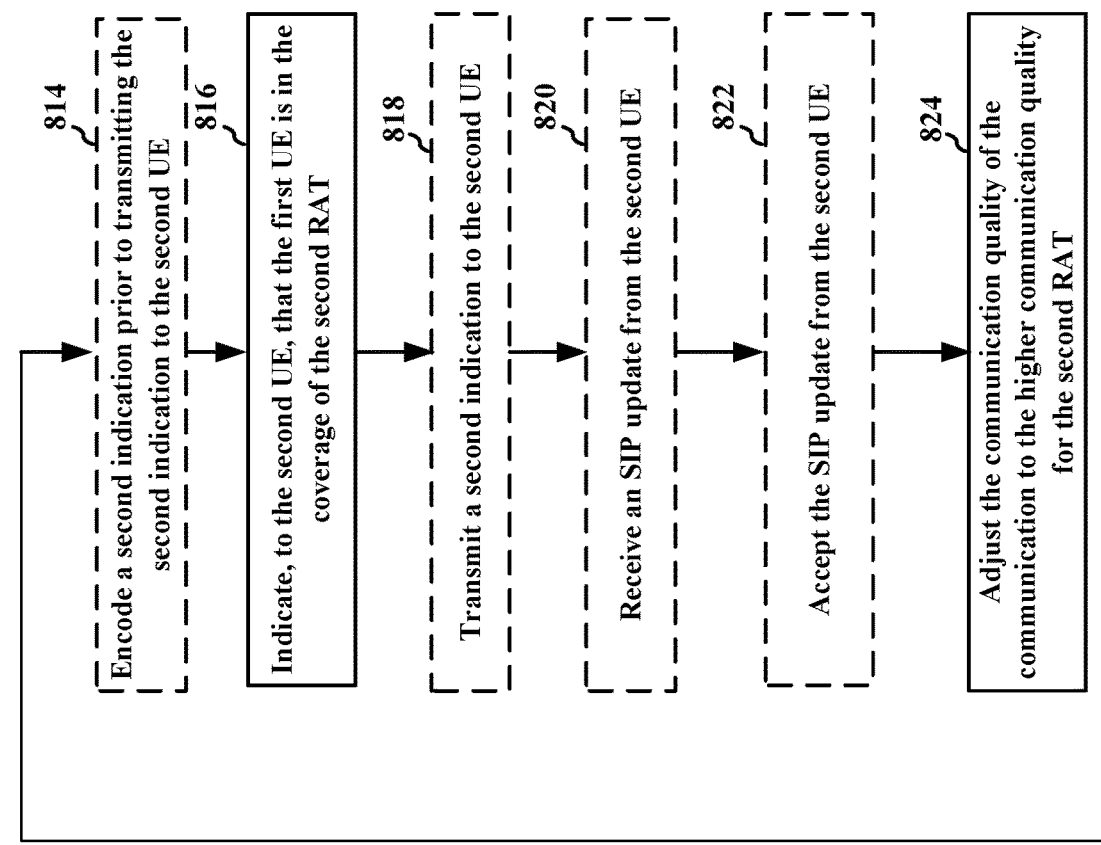
FIG. 8 is a flowchart of a method of wireless communication.

FIG. 8 is a flowchart 800 of a method of wireless communication. The method may be performed by a first UE (e.g., UE 104, 350, 702, 1250; apparatus 902; the processing system 1014, which may include memory 1006 and which may be the entire UE 350 or a component of the UE 350, such as the TX processor 368, the RX processor 356, and/or the controller/processor 359) communicating with a second UE (e.g., UE 191, 350, 704, 950). Optional aspects are illustrated with a dashed line. The methods described herein can provide a number of benefits, such as improving communication signaling, resource utilization, and/or power savings.

At 802, the first UE may determine the first UE is operating using a first RAT, as described in connection with the examples in FIGS. 4, 5, 6 and 7. For example, determination component 908 of apparatus 902 may determine the first UE is operating using a first RAT. At 804, the first UE can also initiate a communication comprising video media between the first UE and a second UE, where the communication quality of the communication can be based on the first RAT, and where the second UE can be operating using a second RAT supporting a higher communication quality than the first RAT, as described in connection with the examples in FIGS. 4, 5, 6 and 7. For example, communication component 910 of apparatus 902 may initiate a communication comprising video media between the first UE and a second UE. At 806, the first UE can receive a first indication from the second UE, where the first indication indicates the second UE is operating using the second RAT, as described in connection with the examples in FIGS. 4, 5, 6 and 7. For example, reception component 904 of apparatus 902 may receive a first indication from the second UE. In some aspects, the first indication can be received in one or more first data packets. At 808, the first UE can also determine that the first UE is in coverage of the second RAT, as described in connection with the examples in FIGS. 4, 5, 6 and 7. For example, determination component 908 of apparatus 902 may determine that the first UE is in coverage of the second RAT. At 810, the first UE can determine whether the first UE is operating using the second RAT, as described in connection with the examples in FIGS. 4, 5, 6 and 7. For example, determination component 908 of apparatus 902 may determine whether the first UE is operating using the second RAT. At 812, the first UE can also hand off from the first RAT to the second RAT, as described in connection with the examples in FIGS. 4, 5, 6 and 7. For example, hand off component 906 of apparatus 902 may hand off from the first RAT to the second RAT.

At 814, the first UE can also encode a second indication prior to transmitting the second indication to the second UE, as described in connection with the examples in FIGS. 4, 5, 6 and 7. For example, communication component 910 of apparatus 902 may encode a second indication. At 816, the first UE can also indicate, to the second UE, that the first UE is in the coverage of the second RAT, as described in connection with the examples in FIGS. 4, 5, 6 and 7. For example, transmission component 914 of apparatus 902 may indicate, to the second UE, that the first UE is in the coverage of the second RAT. At 818, the first UE can transmit a second indication to the second UE, where the second indication indicates the first UE is operating using the second RAT, as described in connection with the examples in FIGS. 4, 5, 6 and 7. For example, transmission component 914 of apparatus 902 may transmit a second indication to the second UE. In some aspects, the second indication can be transmitted to the second UE in one or more second data packets, as described in connection with the examples in FIGS. 4, 5, 6 and 7.

At 820, the first UE can receive an SIP update from the second UE, where the SIP update indicates a video rate based on the first RAT, as described in connection with the examples in FIGS. 4, 5, 6 and 7. For example, reception component 904 of apparatus 902 may receive an SIP update from the second UE. At 822, the first UE can also accept the SIP update from the second UE, where the communication following acceptance of the SIP update can be transmitted using the video rate indicated in the SIP from the second UE, as described in connection with the examples in FIGS. 4, 5, 6 and 7. For example, determination component 908 of apparatus 902 may accept the SIP update from the second UE. At 824, the first UE can also adjust the communication quality of the communication to the higher communication quality for the second RAT, as described in connection with the examples in FIGS. 4, 5, 6 and 7. For example, adjustment component 912 of apparatus 902 may adjust the communication quality of the communication.

In some aspects, a lower resolution may be supported by the first RAT and a higher resolution may be supported by the second RAT, as described in connection with the examples in FIGS. 4, 5, 6 and 7. Also, the communication can comprise a video telephony (VT) call, where the communication quality includes a resolution of the VT call, as described in connection with the examples in FIGS. 4, 5, 6 and 7. Further, a bandwidth supported by the first RAT may be different from a bandwidth supported by the second RAT, as described in connection with the examples in FIGS. 4, 5, 6 and 7. In some aspects, the first RAT can comprise Wi-Fi or long term evolution (LTE) and the second RAT can comprise new radio (NR), as described in connection with the examples in FIGS. 4, 5, 6 and 7.

Figure 9:
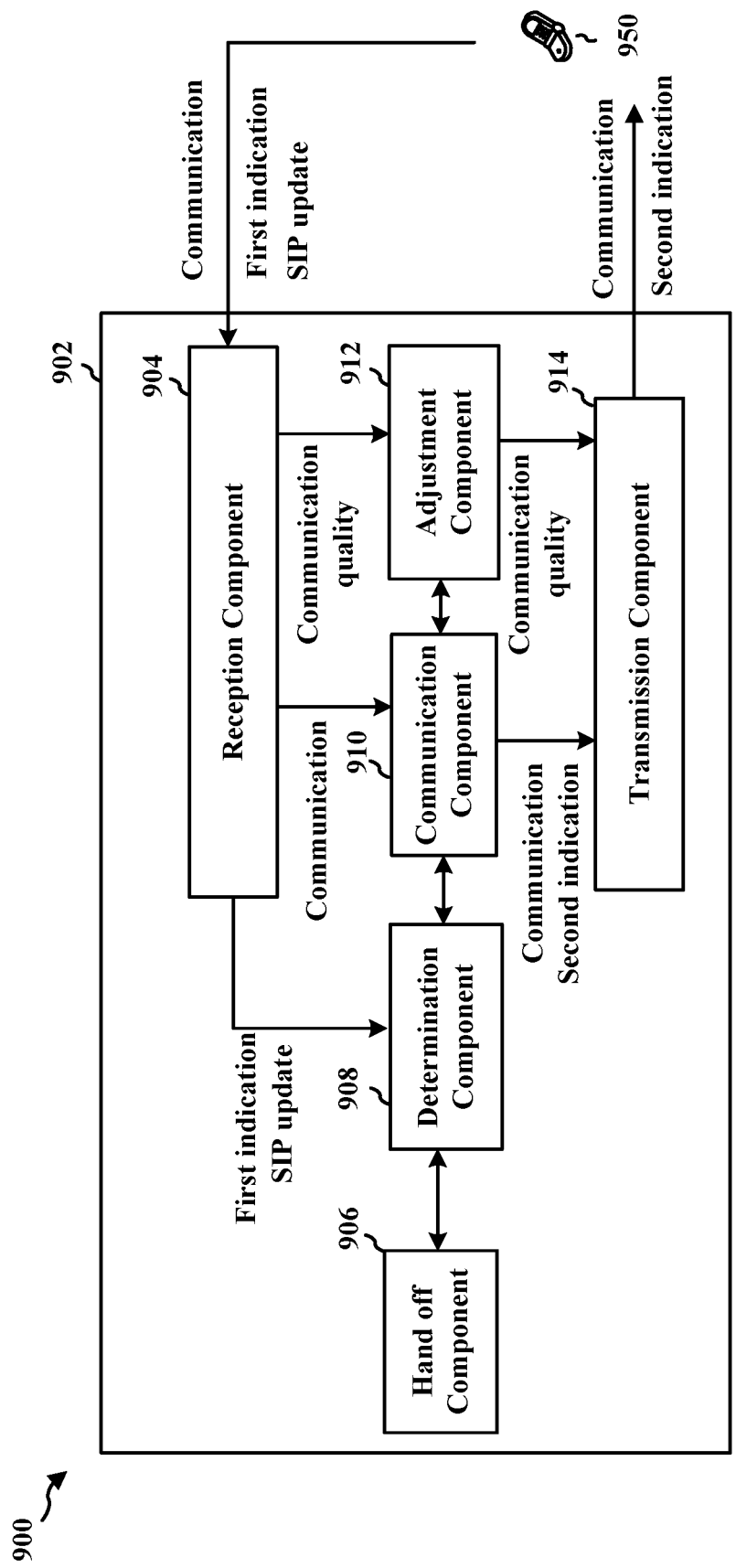
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE. The apparatus includes a reception component 904 that is configured to receive a first indication from the second UE, e.g., as described in connection with step 806 above. The apparatus includes a hand off component 906 that that is configured to hand off from a first RAT to a second RAT, e.g., as described in connection with step 812 above. The apparatus includes a determination component 908 that is configured to determine the first UE is operating using a first RAT, e.g., as described in connection with step 802 above. The apparatus includes a communication component 910 that is configured to initiate a communication comprising video media between the first UE and a second UE, e.g., as described in connection with step 804 above. The apparatus includes an adjustment component 912 that is configured to adjust the communication quality of the communication, e.g., as described in connection with step 824 above. The apparatus includes an transmission component 914 that is configured to transmit a second indication to the second UE, e.g., as described in connection with step 818 above.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
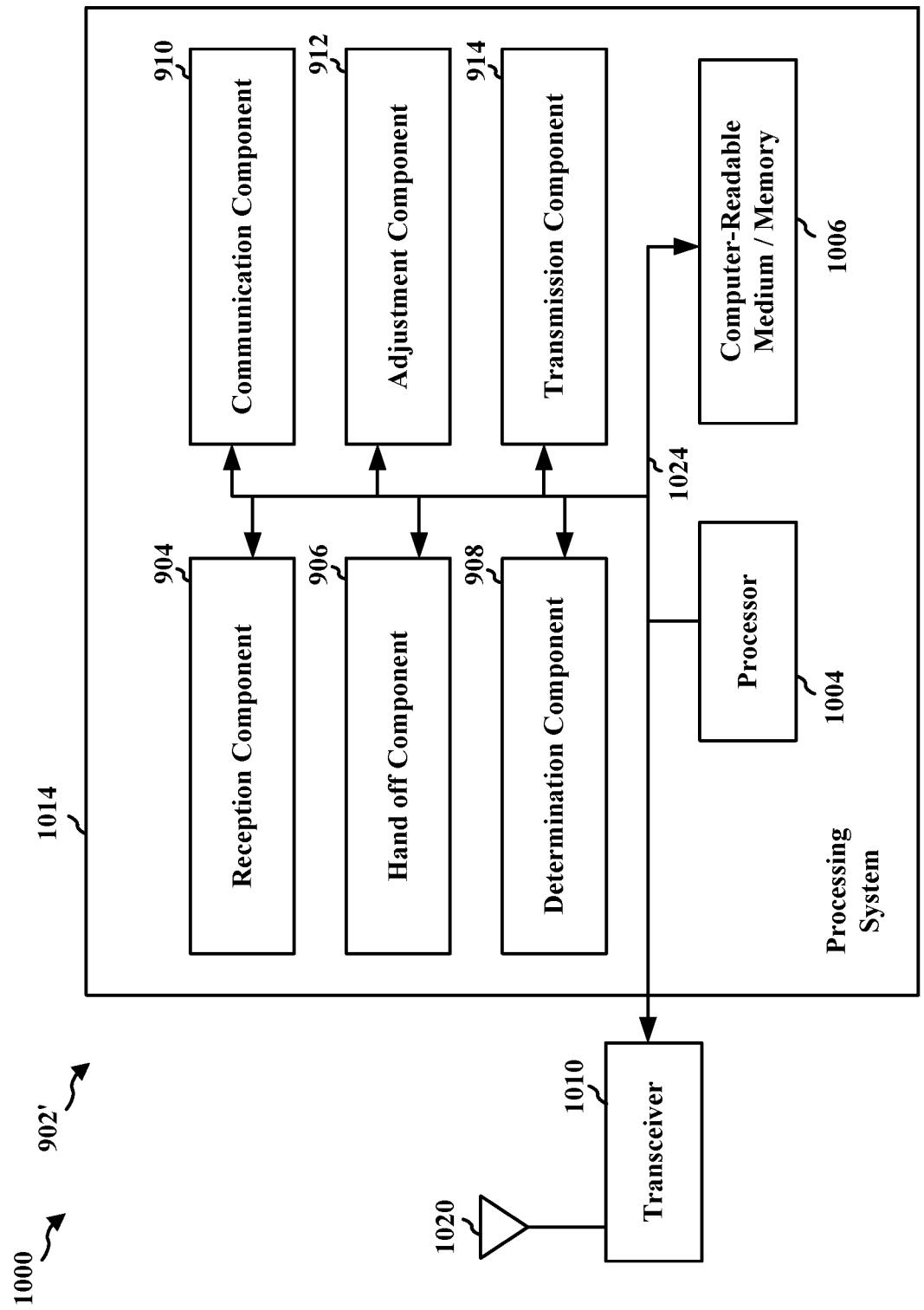
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 914, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for determining the first UE is operating using a first RAT. The apparatus can also include means for initiating a communication comprising video media between the first UE and a second UE. The apparatus can also include means for determining that the first UE is in coverage of the second RAT. The apparatus can also include means for indicating, to the second UE, that the first UE is in the coverage of the second RAT. The apparatus can also include means for adjusting the communication quality of the communication to the higher communication quality for the second RAT. The apparatus can also include means for determining whether the first UE is operating using the second RAT. The apparatus can also include means for receiving a first indication from the second UE. The apparatus can also include means for handing off from the first RAT to the second RAT. The apparatus can also include means for transmitting a second indication to the second UE. The apparatus can also include means for encoding the second indication prior to transmitting the second indication to the second UE. The apparatus can also include means for receiving a session initiation protocol (SIP) update from the second UE. The apparatus can also include means for accepting the SIP update from the second UE. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
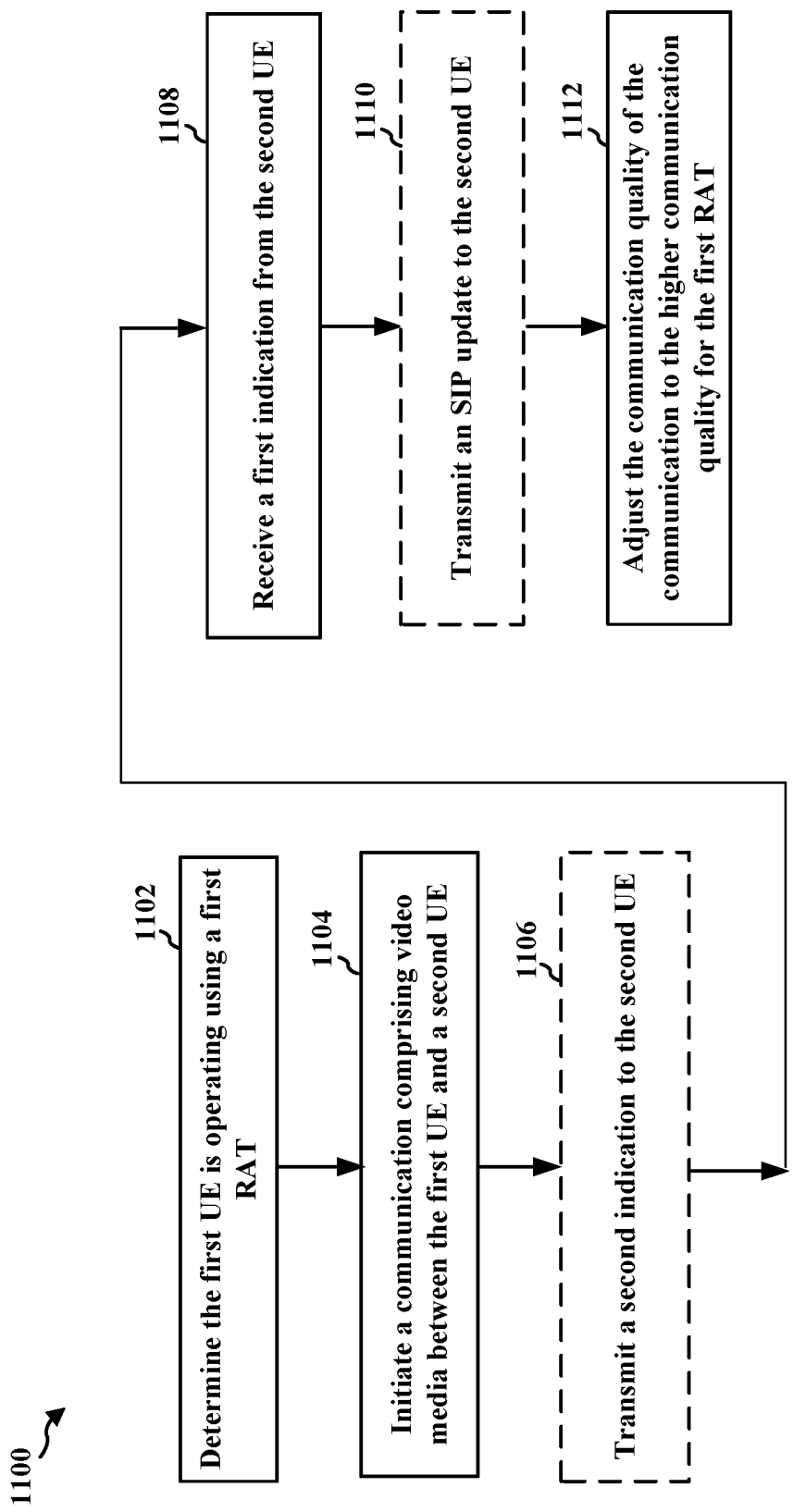
FIG. 11 is a flowchart of a method of wireless communication.

FIG. 11 is a flowchart 1100 of a method of wireless communication. The method may be performed by a first UE (e.g., UE 191, 350, 704, 950; apparatus 1202; the processing system 1314, which may include memory 1306 and which may be the entire UE 350 or a component of the UE 350, such as the TX processor 368, the RX processor 356, and/or the controller/processor 359) communicating with a second UE (e.g., UE 104, 350, 702, 1250). Optional aspects are illustrated with a dashed line. The methods described herein can provide a number of benefits, such as improving communication signaling, resource utilization, and/or power savings.

At 1102, the first UE may determine the first UE is operating using a first RAT, as described in connection with the examples in FIGS. 4, 5, 6 and 7. For example, determination component 1206 of apparatus 1202 may determine the first UE is operating using a first RAT. At 1104, the first UE can also initiate a communication comprising video media between the first UE and a second UE, where the communication quality of the communication can be based on the first RAT, and where the second UE can be operating using a second RAT supporting a higher communication quality than the first RAT, as described in connection with the examples in FIGS. 4, 5, 6 and 7. For example, communication component 1208 of apparatus 1202 may initiate a communication comprising video media between the first UE and a second UE.

At 1106, the first UE can transmit a second indication to the second UE, where the first indication indicates the first UE is operating using the first RAT, as described in connection with the examples in FIGS. 4, 5, 6 and 7. For example, transmission component 1212 of apparatus 1202 may transmit a second indication to the second UE. In some aspects, the second indication can be transmitted in one or more second data packets, as described in connection with the examples in FIGS. 4, 5, 6 and 7. At 1108, the first UE can receive a first indication from the second UE, where the first indication indicates the second UE is in coverage of the first RAT. For example, reception component 1204 of apparatus 1202 may receive a first indication from the second UE. At 1110, the first UE can also transmit an SIP update to the second UE, where the SIP update indicates a video rate based on the first RAT, as described in connection with the examples in FIGS. 4, 5, 6 and 7. For example, transmission component 1212 of apparatus 1202 may transmit an SIP update to the second UE. At 1112, the first UE can also adjust the communication quality of the communication to the higher communication quality for the first RAT, as described in connection with the examples in FIGS. 4, 5, 6 and 7. For example, adjustment component 1210 of apparatus 1202 may adjust the communication quality of the communication.

In some aspects, a higher resolution may be supported by the first RAT and a lower resolution may be supported by the second RAT, as described in connection with the examples in FIGS. 4, 5, 6 and 7. The communication can comprise a VT call, where the communication quality includes a resolution of the VT call, as described in connection with the examples in FIGS. 4, 5, 6 and 7. Additionally, a bandwidth supported by the first RAT may be different from a bandwidth supported by the second RAT, as described in connection with the examples in FIGS. 4, 5, 6 and 7. In some aspects, the first RAT can comprise new radio (NR) and the second RAT can comprise Wi-Fi or long term evolution (LTE), as described in connection with the examples in FIGS. 4, 5, 6 and 7.

Figure 12:
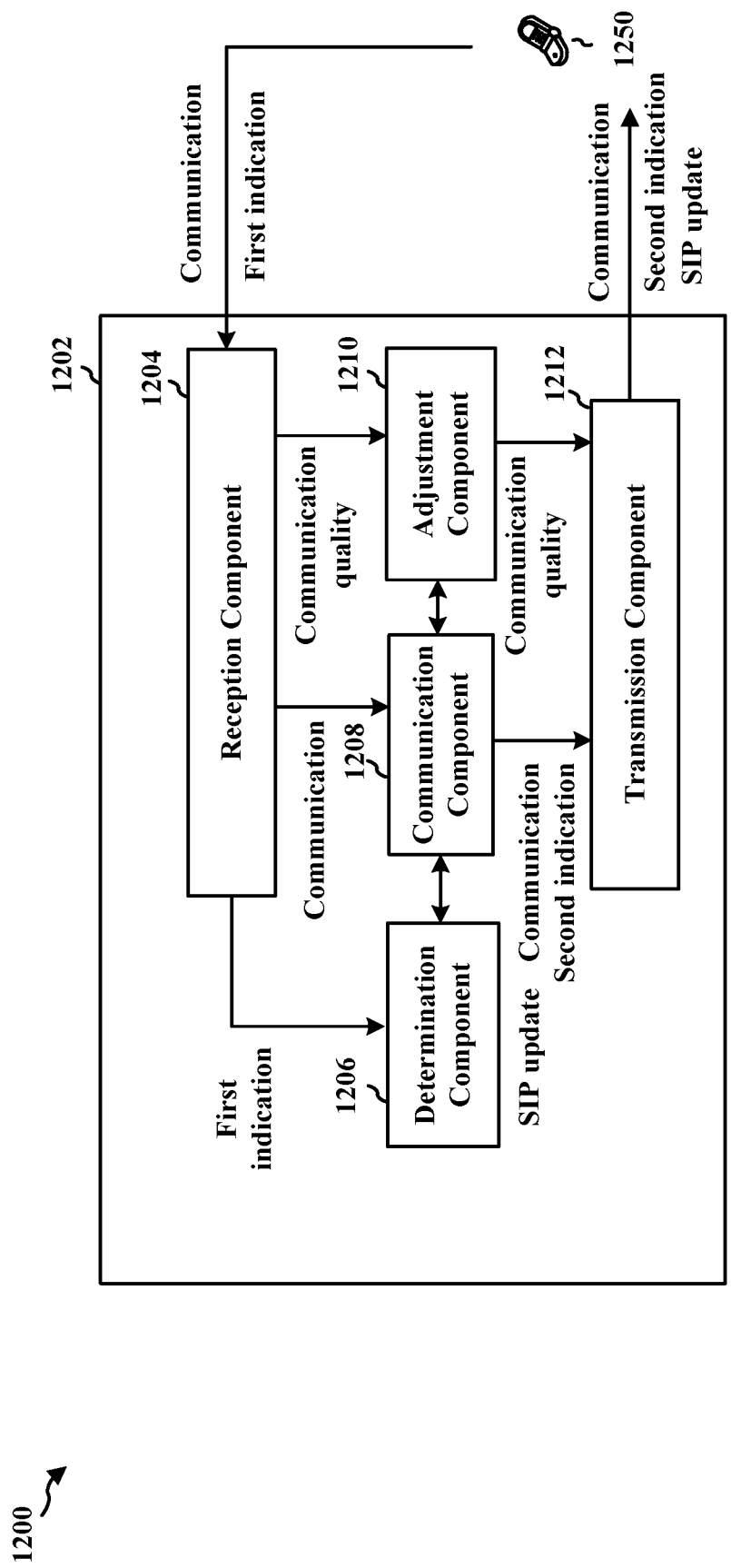
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE. The apparatus includes a reception component 1204 that is configured to receive a first indication from the second UE, e.g., as described in connection with step 1108 above. The apparatus includes a determination component 1206 that is configured to determine the first UE is operating using a first RAT, e.g., as described in connection with step 1102 above. The apparatus includes a communication component 1208 that is configured to initiate a communication comprising video media between the first UE and a second UE, e.g., as described in connection with step 1104 above. The apparatus includes an adjustment component 1210 that is configured to adjust the communication quality of the communication, e.g., as described in connection with step 1112 above. The apparatus includes a transmission component 1212 that is configured to transmit an SIP update to the second UE, e.g., as described in connection with step 1110 above.

The apparatus may include additional components that perform each of the blocks of the algorithm in the aforementioned flowcharts of FIGS. 7 and 11. As such, each block in the aforementioned flowcharts of FIGS. 7 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
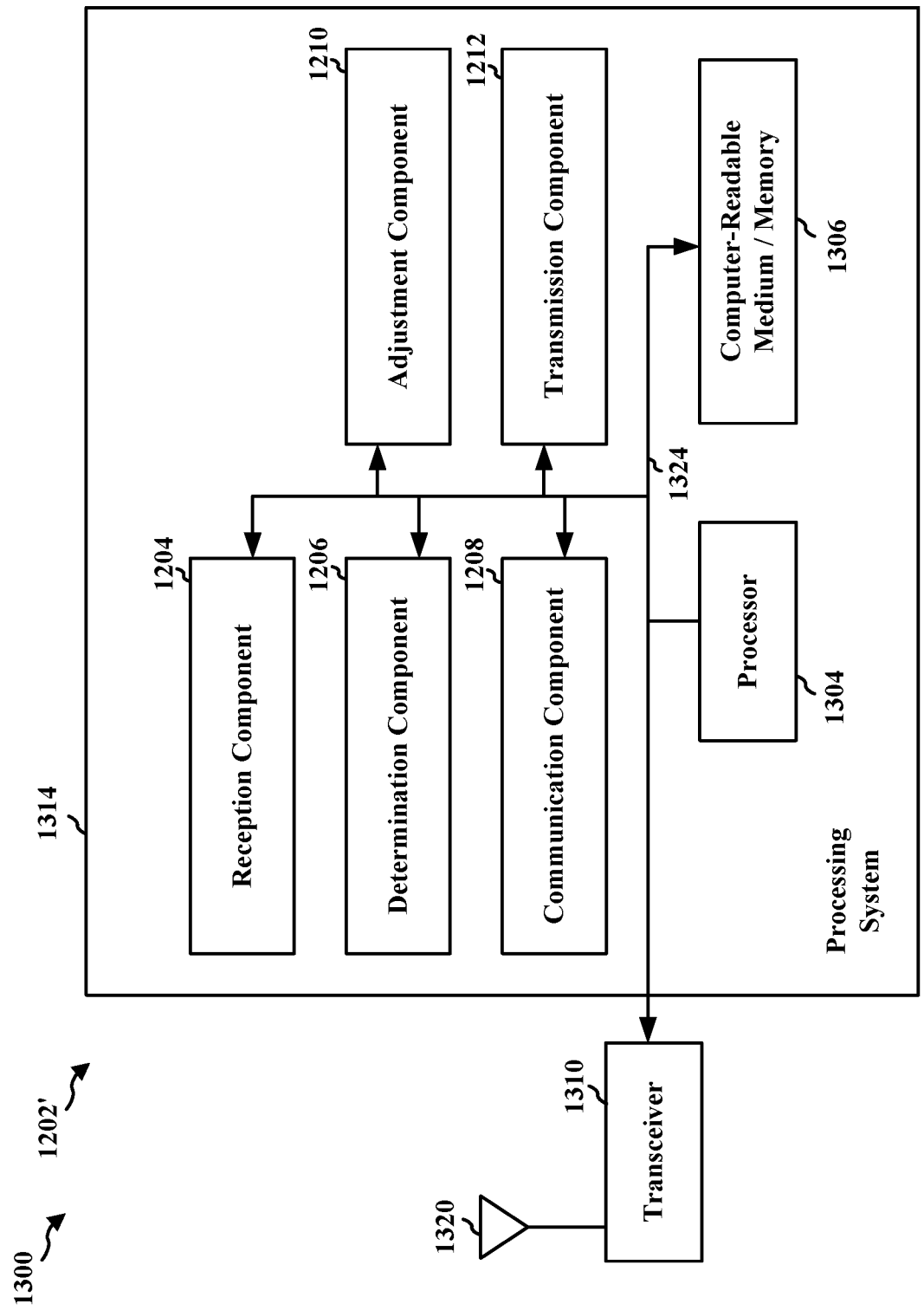
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for determining the first UE is operating using a first RAT supporting a higher communication quality than a second RAT. The apparatus can also include means for initiating a communication comprising video media between the first UE and a second UE operating using the second RAT including a communication quality based on the second RAT. The apparatus can also include means for receiving a first indication from the second UE. The apparatus can also include means for adjusting the communication quality of the communication to the higher communication quality of the first RAT when the second UE is operating using the first RAT. The apparatus can also include means for transmitting a second indication to the second UE. The apparatus can also include means for transmitting a SIP update to the second UE.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects of the present disclosure described herein can provide a number of benefits or advantages, such as improving communication signaling, resource utilization, and/or power savings. For instance, aspects of the present disclosure can help a UE obtain the best rate possible for communication with another device. Thus, the present disclosure can use the maximum communication quality. Also, aspects of the present disclosure can provide a highest quality video call with a fast change in the video rate, e.g., without much signaling.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method of wireless communication at a first User Equipment (UE), comprising:
   determining the first UE is operating using a first radio access technology (RAT);
   initiating a communication comprising video media between the first UE and a second UE, wherein a communication quality of the communication is based on the first RAT, wherein the second UE is operating using a second RAT supporting a higher communication quality than the first RAT;
   determining that the first UE is in coverage of the second RAT;
   transmitting, to the second UE, a second indication indicating that the first UE is in the coverage of the second RAT, wherein the second indication indicates the first UE is operating using the second RAT;
   receiving a session initiation protocol (SIP) update from the second UE, wherein the SIP update indicates a video rate based on the second RAT;
   accepting the SIP update from the second UE, wherein the communication following acceptance of the SIP update is based on the video rate indicated in the SIP update; and
   adjusting the communication quality of the communication to the higher communication quality for the second RAT.

2. The method of claim 1, further comprising:
   determining whether the first UE is operating using the second RAT.

3. The method of claim 1, further comprising:
   receiving a first indication from the second UE, wherein the first indication indicates the second UE is operating using the second RAT.

4. The method of claim 3, wherein the first indication is received from the second UE in one or more first data packets.

5. The method of claim 1, further comprising:
   handing off from the first RAT to the second RAT.

6. The method of claim 5, further comprising:
   encoding the second indication prior to transmitting the second indication to the second UE.

7. The method of claim 5, wherein the second indication is transmitted to the second UE in one or more second data packets.

8. The method of claim 1, wherein a lower resolution is supported by the first RAT, and a higher resolution is supported by the second RAT.

9. The method of claim 1, wherein the communication comprises a video telephony (VT) call, wherein the communication quality includes a resolution of the VT call.

10. The method of claim 1, wherein a bandwidth supported by the first RAT is different from a bandwidth supported by the second RAT.

11. The method of claim 1, wherein the first RAT comprises Wi-Fi or long term evolution (LTE) and the second RAT comprises new radio (NR).

12. A method of wireless communication at a first User Equipment (UE), comprising:
   determining the first UE is operating using a first radio access technology (RAT) supporting a higher communication quality than a second RAT;
   initiating a communication comprising video media between the first UE and a second UE operating using the second RAT including a communication quality based on the second RAT;
   receiving a second indication from the second UE, wherein the second indication indicates the second UE is in coverage of the first RAT, wherein the second indication indicates the second UE is operating using the first RAT;
   transmitting a session initiation protocol (SIP) update to the second UE, wherein the SIP update indicates a video rate based on the first RAT, wherein the communication following the SIP update is based on the video rate indicated in the SIP update; and
   adjusting the communication quality of the communication to the higher communication quality of the first RAT when the second UE is operating using the first RAT.

13. The method of claim 12, wherein the second indication is received from the second UE in one or more first data packets.

14. The method of claim 12, further comprising:
   transmitting a first indication to the second UE, wherein the first indication indicates the first UE is operating using the first RAT.

15. The method of claim 14, wherein the first indication is transmitted to the second UE in one or more second data packets.

16. The method of claim 12, wherein a lower resolution is supported by the second RAT, and a higher resolution is supported by the first RAT.

17. The method of claim 12, wherein the communication comprises a video telephony (VT) call, wherein the communication quality includes a resolution of the VT call.

18. The method of claim 12, wherein a bandwidth supported by the first RAT is different from a bandwidth supported by the second RAT.

19. The method of claim 12, wherein the first RAT comprises new radio (NR) and the second RAT comprises Wi-Fi or long term evolution (LTE).

20. An apparatus for wireless communication at a first User Equipment (UE), comprising:
   a memory; and
   at least one processor coupled to the memory and configured to:
     determine the first UE is operating using a first radio access technology (RAT);
     initiate a communication comprising video media between the first UE and a second UE, wherein a communication quality of the communication is based on the first RAT, wherein the second UE is operating using a second RAT supporting a higher communication quality than the first RAT;
     determine that the first UE is in coverage of the second RAT;
     transmit, to the second UE, a second indication indicating that the first UE is in the coverage of the second RAT, wherein the second indication indicates the first UE is operating using the second RAT;
     receive a session initiation protocol (SIP) update from the second UE, wherein the SIP update indicates a video rate based on the second RAT;
     accept the SIP update from the second UE, wherein the communication following acceptance of the SIP update is based on the video rate indicated in the SIP update; and adjust the communication quality of the communication to the higher communication quality for the second RAT.

21. The apparatus of claim 20, wherein the at least one processor is further configured to:
determine whether the first UE is operating using the second RAT.

22. The apparatus of claim 20, wherein the at least one processor is further configured to:
receive a first indication from the second UE, wherein the first indication indicates the second UE is operating using the second RAT, wherein the first indication is received from the second UE in one or more first data packets.

23. The apparatus of claim 20, wherein the at least one processor is further configured to:
hand off from the first RAT to the second RAT.

24. An apparatus for wireless communication at a first User Equipment (UE), comprising:
a memory; and
at least one processor coupled to the memory and configured to:
determine the first UE is operating using a first radio access technology (RAT) supporting a higher communication quality than a second RAT;
initiate a communication comprising video media between the first UE and a second UE operating using the second RAT including a communication quality based on the second RAT;
receive a second indication from the second UE, wherein the second indication indicates the second UE is in coverage of the first RAT, wherein the second indication indicates the second UE is operating using the first RAT;
transmit a session initiation protocol (SIP) update to the second UE, wherein the SIP update indicates a video rate based on the first RAT, wherein the communication following the SIP update is based on the video rate indicated in the SIP update; and
adjust the communication quality of the communication to the higher communication quality of the first RAT when the second UE is operating using the first RAT.

25. The apparatus of claim 24, wherein the at least one processor is further configured to:
transmit a first indication to the second UE, wherein the first indication indicates the first UE is operating using the first RAT, wherein the first indication is transmitted to the second UE in one or more second data packets.

* * * * *